United States Patent [19]

Mitchell et al.

[11] 4,124,943

[45] Nov. 14, 1978

[54] AUDIO VISUAL INFORMATION SYSTEM

[75] Inventors: James A. H. Mitchell, London; Edward J. Day, Kingston Surry, both of England

[73] Assignee: Mitchell Beazley Encyclopedias, Ltd., London, England

[21] Appl. No.: 616,551

[22] Filed: Sep. 25, 1975

[51] Int. Cl.$^2$ .............................................. G09B 19/08
[52] U.S. Cl. ...................................... 35/8 A; 283/43; 35/35 E
[58] Field of Search ............ 35/8 A, 9 R, 35 C, 35 E; 274/42 P; 40/340; 283/36–43

[56] References Cited

U.S. PATENT DOCUMENTS

| | | | |
|---|---|---|---|
| 1,236,333 | 8/1917 | Mayhew | 35/8 A UX |
| 1,295,763 | 2/1919 | Kohn | 35/8 A UX |
| 3,110,508 | 11/1963 | Sendor | 283/42 X |
| 3,242,596 | 3/1966 | Smith | 35/9 R X |
| 3,404,224 | 10/1968 | Revelo et al. | 35/8 A UX |

FOREIGN PATENT DOCUMENTS

| | | | |
|---|---|---|---|
| 108,083 | 12/1924 | Switzerland | 283/36 |
| 1,039,988 | 8/1966 | United Kingdom | 283/36 |

OTHER PUBLICATIONS

Encyclopedia Brittanica; 15th Ed. ©1974, vol. 2, pp. 1056.

*Primary Examiner*—William H. Grieb
*Attorney, Agent, or Firm*—Stephen E. Feldman; Marvin Feldman

[57] ABSTRACT

A printed illustrated text, printed alphabetical text and printed illustrated index are all correlated to a set of recordings intended for audio visual display and which are in turn topically arranged. In addition the illustrated index may by themselves be recorded in their entireties for audio visual display. The illustrated text is presented by a main written portion heavily pictorialized by a key illustration and ancillary illustrations arranged in a predetermined sequence with ancillary supporting information. A conspicuously displaying cross-reference listing refers to other pertinent illustrated texts and topical audio visual recordings. The alphabetical text is correlated to pertinent portions of the illustrated text by having, on pertinent pages thereof, key illustrations from the illustrated text. It, in addition, carries cross-references to pertinent optical audio visual recordings as well as to other pertinent information in the system. The illustrated index, which may include reduced reproductions of entire pages from the illustrated text, is also cross-referenced to pertinent topical audio visual recordings. The jackets for each topical audio visual recording include a printed display of pertinent portions of the illustrated text and pertinent portions from the alphabetical text. In addition sub-topic titles, and/or illustrations indicative of such sub-topics, are arranged in positions corresponding to the position of the recorded sub-topic information; and are printed either directly upon the audio visual recording or a transparent sleeve carried by the jacket.

24 Claims, 9 Drawing Figures a# AUDIO VISUAL INFORMATION SYSTEM

BACKGROUND OF THE INVENTION - FIELD OF APPLICATION

This invention relates to an information system, and more particularly to a system for arranging indexing and cross-referencing information pictorially and by words for audio visual presentation.

BACKGROUND OF THE INVENTION - DESCRIPTION OF PRIOR ART

The quest for information, or research as it is more formally called, is carried on in many ways. One may go to texts, magazine articles, newspapers or like material when pursuing information about a particular topic. No such research is considered to be complete without looking up the subject in an encyclopedia type reference text. In fact, a great deal of such research, especially by students in various grades of school and even college, both begins and ends with the encyclopedia.

Many persons, school students and otherwise, find reading printed texts, even heavily illustrated printed texts, cumbersome and difficult. A significant portion of the population lacks the ability to understand by reading alone, and learns better when printed text is supported by audio and audio visual material. But available research material is almost invariably only available in printed form.

More often than not a number of students are assigned the identical topic to research. But encyclopedia type research texts are expensive and only a few libraries can afford more than one set of a particular encyclopedia. Thus each student must wait their turn. Some may even find it impossible to get a time to review the encyclopedia and may have to do without this invaluable source of information.

When describing to a group how to use an encyclopedia; or when presenting the results of research from an encyclopedia to a group, one can either hold up the text for the group to view or pass the text around for better understanding. If equipped with a projector the pertinent encyclopedia pages may be shown on a screen. But all of the above make for difficult presentations, may subject the text pages to tearing, marking or other damage and require an articulate speaker if an interesting and understandable presentation is to be made.

SUMMARY OF THE INVENTION

It is therefore an object of this invention to provide a novel and improved information system.

It is another object of this invention to provide a novel and improved audio visual information system.

It is a further object of this invention to provide a novel and improved system for storing topical information for audio visual presentation.

It is yet a further object of this invention to provide a novel and improved information system wherein topical information prepared for audio visual presentation is cross-referenced with like alphabetically and topically arranged printed information.

It is yet still a further object of this invention to provide a novel and improved information system wherein encyclopedia type reference texts are recorded in their entirety for audio visual presentation.

It is yet still a further object of this invention to provide a novel and improved jacket for housing an audio visual recording.

It is yet still a further object of this invention to provide a novel and improved audio visual recording jacket wherein information corresponding to the recorded information is printed by words and illustrations upon the jacket.

It is yet still a further object of this invention to provide a novel and improved audio visual recording.

It is yet still a further object of this invention to provide a novel and improved manner of correlating sub-topic information on an audio visual recording to the position on the physical recording where the sub-topic information is recorded.

In carrying out the invention, according to the preferred embodiment, there is provided an information system utilizing audio visual recording for topical presentation of alphabetically arranged expanded entry type descriptions and comprehensive heavily illustrated encyclopedia type reference material; and, in fact, for presentation of entire texts of such expanded dictionary type definitions and encyclopedia arranged information. Cross-referencing of the topical audio visual recordings into the alphabetical and illustrated texts provides for a highly correlated reference work.

Other objects, features, and advantages of the invention, in its details of construction and arrangement of parts, will be seen from the above, from the following description of the preferred embodiment when considered in conjunction with the drawing and from the appended claims.

DESCRIPTION OF THE PREFERRED EMBODIMENT

For convenience the invention will be described as applied to an information system including a plurality of audio visual recordings each in the form of a disc adapted for optical scanning and playback through a home type television set, and wherein the audio visual recordings are of selected topics from an encyclopedia type text heavily illustrated in color and with insertions from an alphabetical text of expanded entry type descriptions. A jacket for housing each such optical audio visual recording is provided on its back page with printed reproductions of part of all of the comprehensive text article and with one or more pertinent alphabetical text descriptions and carries a sleeve for the recording with either the sleeve or the recording itself printed with sub-topic titles or illustrations at positions indicative of the recorded positions corresponding to sub-topic. It should be understood, nevertheless, that without departing from the scope of the invention that subject information system may be recorded on tape or other suitable non-disc forms, may be played back through non-optional scanning and by closed circuit and/or other suitable television type presentation means; that the recorded information may be not only topical but also the entire comprehensive illustrated text and alphabetical illustrated text with their respective indexes or for that matter, the text of any dictionary, encyclopedia or other reference work; that the jacket for housing the recording may have the information printed on any portion thereof or not at all; and that other suitable means may be provided for indicating where in the recording a sub-topic begins if such be desired at all.

Figure 1:
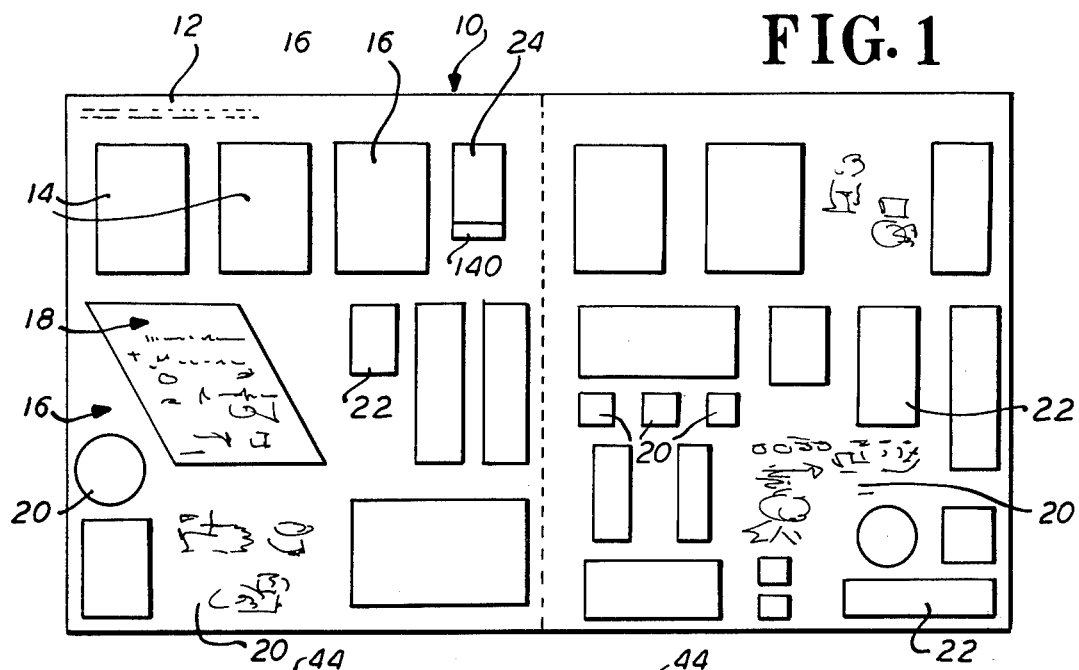
FIG. 1 is a specimen layout from an illustrated comprehensive text showing the relationship between the elements thereof which incorporate the instant system.

With reference to FIG. 1 there is generally shown at 10 a specimen page from a comprehensive illustrated text as described in our co-pending application entitled "System for Arranging and Retrieving Information" and which was filed on Sept. 25, 1975 as application Ser. No. 616,865. In that application each such page, or group of pages, forming the comprehensive illustrated text is described as including, under a subject heading 12 a main word text 14 and a set of color illustrations 16 including a key illustration 18 and ancillary illustrations 20 accompanied by ancillary text 22, and often consecutively numbered to facilitate the flow thereof in an orderly manner.

A cross-reference listing 24 is conspicuously displayed in a marginal position on each such layout 10.

Also described in my above mentioned application is an illustrated alphabetically arranged text 40 (FIG. 2) including a plurality of alphabetically arranged expanded short entry type word descriptions 42, arranged in a particular portion of the page; accompanied by a number of reproductions of the key illustrations 44 from the comprehensive illustrated text 10 also displayed in a particular portion of the printed page. The alphabetical text is described in said application as including cross-reference information to the comprehensive illustrated text as part of the captions 46 to said reproductions 44 of said key illustrations and as part of the printed text 42 as shown at 48.

An illustrated comprehensive index 50 (FIG. 3) is additionally described in my aforementioned co-pending application. Index 50 is described as including reduced size reproductions 52 of full text pages from the comprehensive illustrated text 10 adjacent to which appear columns 54, 56, 58 and 60 respectively of cross-referencing to other information both within and outside of the information system. It will be appreciated that the index may be located at any place in the illustrated aliphabetical text or the illustrated comprehensive text or in a volume by itself. If the index appears at the front of a volume, it may be referred to as a table of contents or other suitable term.

Figure 4:
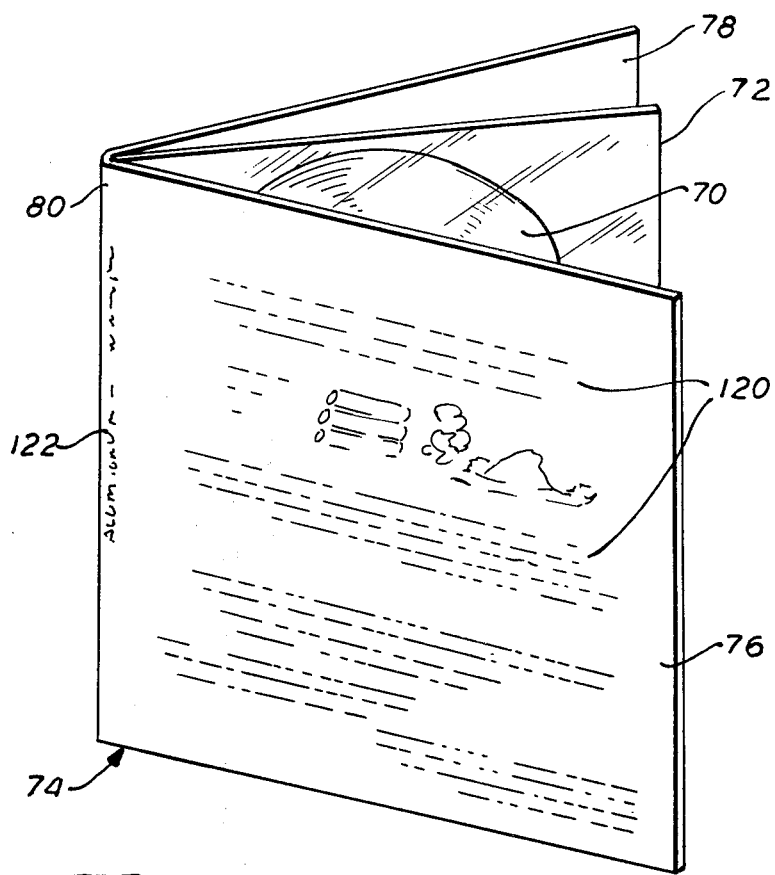
FIG. 4 is a schematic showing of a topical information jacket which houses an audio visual recording of a topic corresponding to one of the topics which appear in the illustrated comprehensive text of the type which would be displayed on a page as shown in FIG. 1 and which incorporate the instant invention.

To accompany, compliment and supplement the aforementioned "System For Arranging and Retrieving Information" there are provided a number of topical video visual recordings such as the one illustrated at 70 in FIG. 4. Recording 70 is shown as housed in a sleeve 72 carried by a jacket 74 having a front cover 76, and a rear cover 78 connected to a spine 80.

While each such recording 70 is herein described as for a single topic corresponding to a topic from the comprehensive illustrated text 10; it should be realized that space requirements for properly covering the topic may dictate the use of multiple recording 70 for a single topic. In the alternative a single recording 70 may cover more than one such topic if the topic content so permits.

Also contemplated by the instant system is a single recording 70, or multiple recordings 70, which encompass the entire illustrated comprehensive text 10, illustrated alphabetical text 40 and illustrated comprehensive index 50.

Recording 70 is shown as a disc but it should be realized that tape or other suitable recording means may just as easily be utilized.

Figure 5:
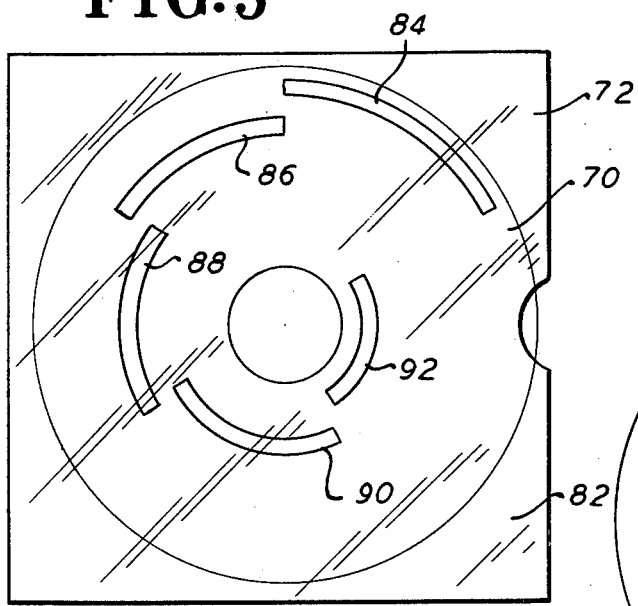
FIG. 5 is a schematic showing of a form of sleeve from the information jacket of FIG. 4 which houses and protects the recording and which incorporates the instant invention.

In FIG. 5 sleeve 72 is shown removed from jacket 74 but with a recording disc 70 still disposed therein. Sleeve 72 is preferably of transparent material such as plastic or the like; but other suitable materials may be used. Printed upon the surface 82 of sleeve 72 are sub-topic titles 84, 86, 88, 90 and 92 which correspond to sub-topics of the topic recorded in audio visual manner upon recording 70. Titles 84, 86, 88, 90 and 92 are also positioned upon surface 82 in alignment to the position on recording 70 where the sub-topic information is recorded. Also, the frame numbers themselves may be printed on the sleeve. In this manner the user may easily position the playback equipment for recording 70 so as to begin at a particular sub-topic instead of having to either start at the beginning of recording 70 and play everything until the desired sub-topic appears, or merely guessing hit or miss until the user finds the place desired to start.

Figure 6:
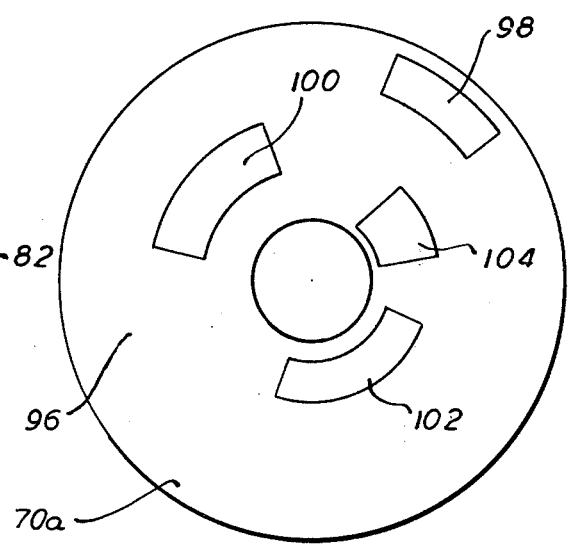
FIG. 6 is a modified form of information recording for use with the information jacket of FIG. 4 and which incorporates the instant invention.
Figure 7:
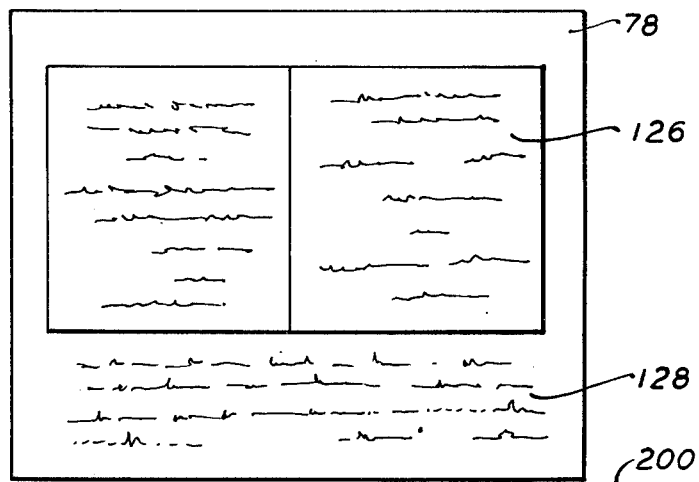
FIG. 7 is a specimen layout of the back of the information jacket of FIG. 4.

Alternatively recording 70 may have printed directly upon its recorded surface references to such sub-topics and/or frame numbers. This appears for a recording 70a as shown in FIG. 6 wherein the surface 96 of recording 70a has reproductions of the illustrations 18, 20 from the comprehensive text 10 printed thereon at 98, 100, 102 and 104. Here again the illustrations are positioned to correspond to the position of recording of their respective sub-topic or frame.

Printed titles such as 84, 86, 88, 90 and 92 may accompany or be substituted for illustrations 98, 100, 102, 104 of FIG. 6; while illustrations such as 98, 100, 102 and 104 may accompany or be substituted for the titles 84, 86, 88, 90 and 92 of FIG. 5. the important object is to provide some form of index to direct the user to a selected recorded area of recording 70.

Jacket 74 may have displayed, as by printing, upon the facing page of front cover 76 information 120 (FIG. 4) including words and illustrations, indicative of the topic or topics recorded upon recording 70 housed therewithin. A title 122 may likewise appear upon spine 80.

On the facing page of back cover 78 of jacket 74 there is reproduced, as by printing or other suitable means, at 126 a copy of the pages of the comprehensive illustrated text (such as shown at 10 in FIG. 1) corresponding to the topic of recording 70. Also reproduced on back cover 78 as at 128 is a copy of pertinent alphabetical text descriptions compiled from the illustrated alphabetical text as described for FIG. 2.

Each topical recording 70 is in turn cross-referenced into the comprehensive illustrated text, as described for FIG. 1, and will appear therein either in the cross-reference listing 24 or at a position 140 closely adjacent thereto and so as to be conspicuous.

Figure 2:
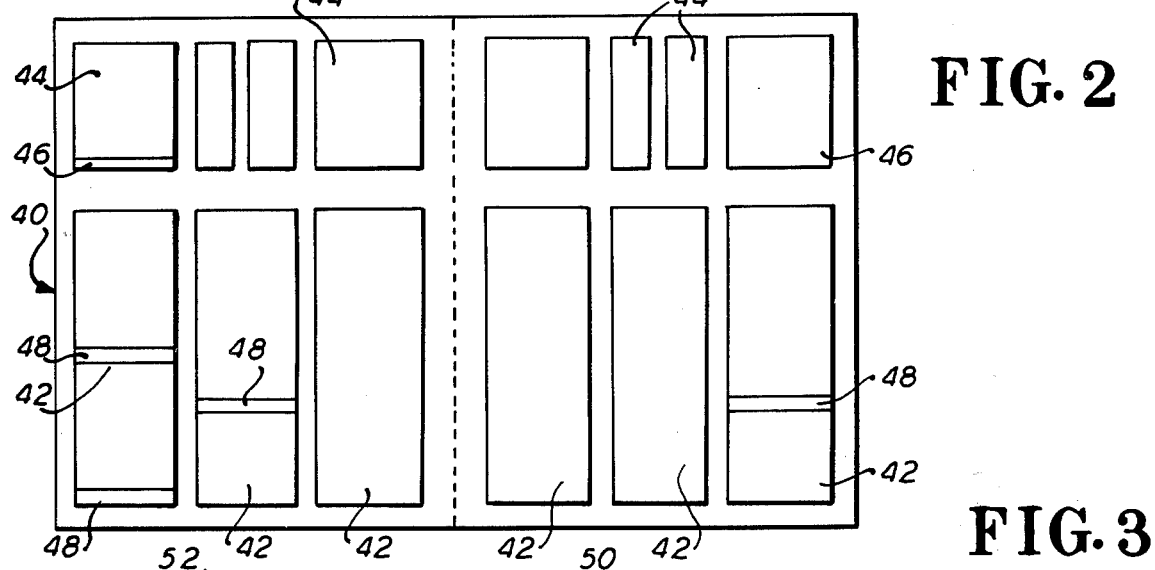
FIG. 2 is a specimen layout of a page from an illustrated alphabetical text showing the relationship between the elements thereof which incorporate the instant invention.

Cross-referencing of the availability of a topical recording 70 will also appear in the illustrated alphabetical text, as described for FIG. 2. Such cross-referencing may accompany the illustrations appearing at 44 by inclusion in captions 46 or adjacent or proximate thereto. They may appear also or additionally as part of the cross-referencing 48 within texts 42.

Figure 3:
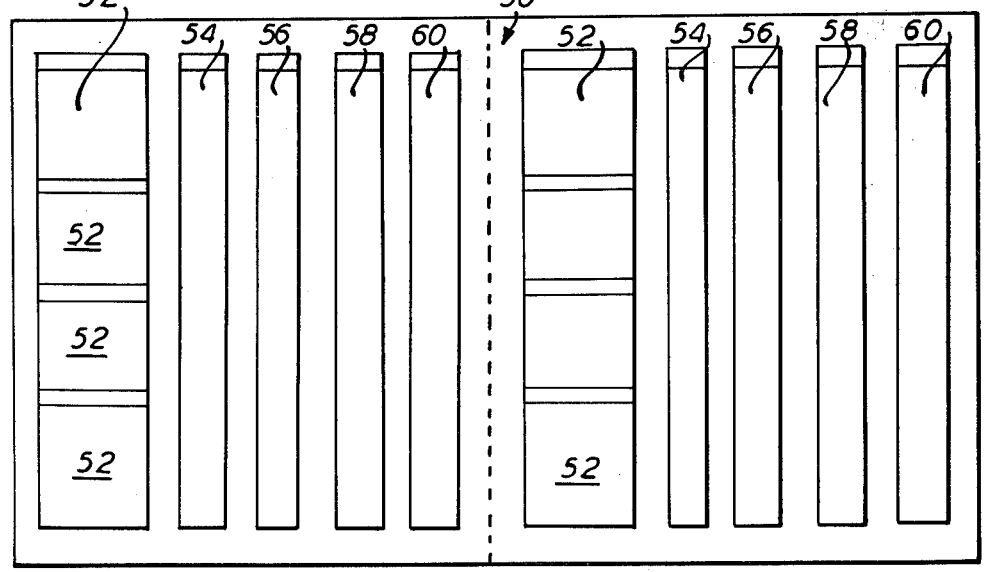
FIG. 3 is a specimen layout of a page from an illustrated comprehensive index showing the relationship between the elements thereof which incorporate the instant invention.

To make the system even more comprehensive cross-referencing to audio visual recordings 70 also are inserted with the columnar material 54, 56, 58, 60 of the comprehensive illustrated index described with reference to FIG. 3. Such cross-referencing may appear within one of the columns 54, 56, 58, 60 or may appear as an additional column or in any other conspicuous manner.

Figure 8:
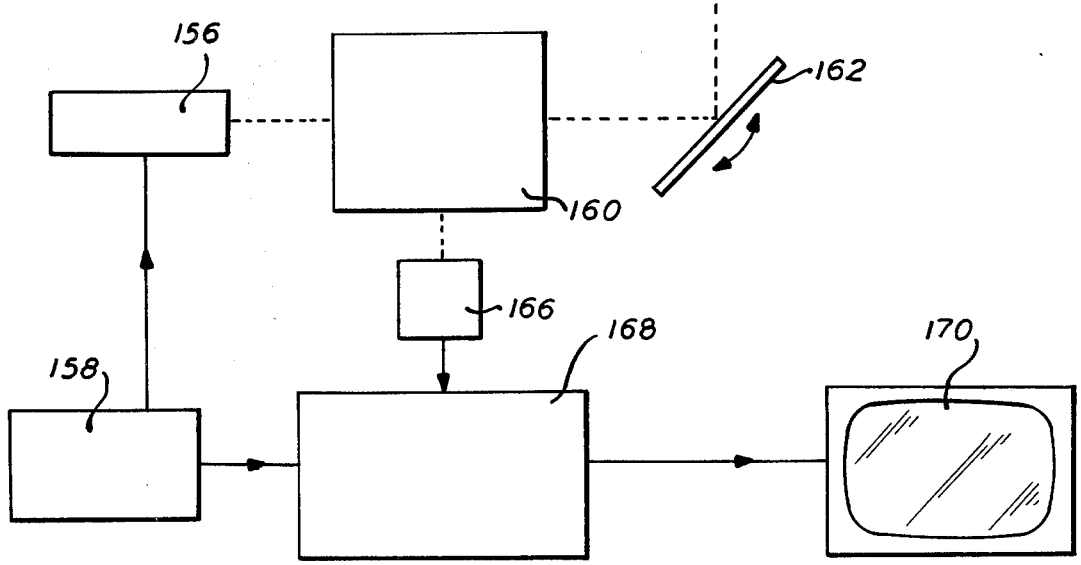
FIG. 8 is a schematic layout of a playback system for utilizing the audio visual recording of the instant invention.

The audio visual information recorded upon recording 70 may be presented to one or more observers on playback equipment 150 such as that shown in FIG. 8. Equipment 150 is of the type conventionally available to the public and more commonly known as a "Philips and MCA Videodisc System". In the schematic of FIG. 8, recording 70 is placed upon videodisc player 152 which is in turn driven by a motor 154 powered from a suitable source and controlled in conventional manner by suitable switches. A laser 156, powered from a supply 158 co-operates with optics 160, a mirror 162 and an objective 164 to transmit successive portions of recording 70 through a light sensitive device 166 to video and servo electronics 168 which in turn control and present the recorded information upon a conventional home TV set 170.

The recorded information is thereby presented successively in frame by frame manner upon the screen of set 170. Suitable controls are provided for equipment 150 to advance same or back same up to any selected position and to freeze any display upon the screen of set 170.

It should be understood that other suitable playback equipment may be utilized; such as the RCA "SelectraVision Videodisc system" and that closed circuit as well as other suitable television presentation equipment may be used to view the recorded information.

When preparing recording 70, if desired, appropriate musical and other sound effect background may be recorded into recording 70 by conventionally available techniques. In a similar manner a voice over reading or description of the text material may be provided to further enhance the understanding thereof.

Figure 9:
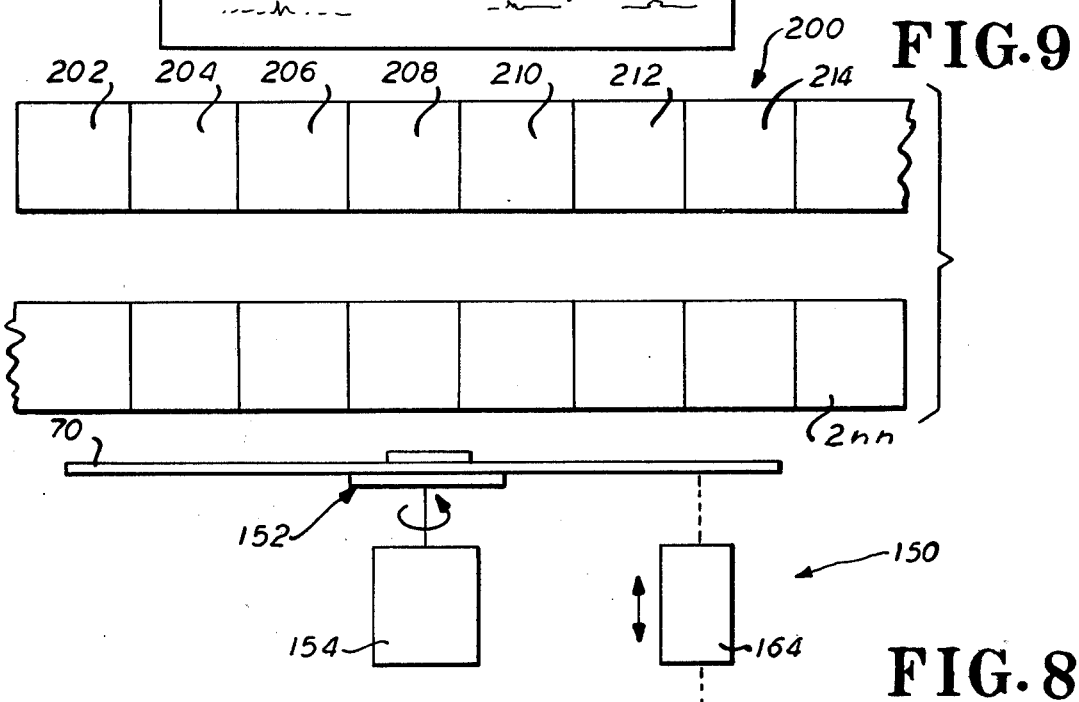
FIG. 9 is a schematic frame by frame layout of a typical topical audio visual recording as same might be displayed by a system such as shown in FIG. 8.

A typical frame by frame arrangement for a topical recording 70 is schematically illustrated in FIG. 9 wherein a strip 200 is shown beginning with frame 202 and proceeding consecutively through frame 204, 206, 208, 210, etc to 2nn.

Frame 202 would carry the title for recording 70 corresponding to the topic recorded theron. Frame 206 and 208 would display reproductions of the entire pages from the comprehensive illustrated text (as described with reference to FIG. 1) and reproductions of pertinent expanded word descriptions from the illustrated alphabetical text (as described with reference to FIG. 2).

Thereafter in frames 210, 212, 214, etc. the entire topic would be covered by sub-topic and where pertinent by reference to sections of the comprehensive illustrated text and expanded word descriptions.

As previously set forth, it is an inherent capability of playback equipment 150 to be able to present the information recorded upon recording 70 either in a continuous manner, or frame by frame freezing each frame for a desired period of time (or a few frames at a time so that the frame appears to be frozen) as controlled by the operator. Accordingly when information is recorded upon recording 70 a suitable number of frames, 202-210 etc. must be recorded for each image to maintain same on the viewing screen long enough to be seen and studied when the playback equipment 150 is in a continuous mode of operation. This is accomplished by conventional techniques well known in the field.

On the other hand, some written and even pictorial information is inserted on recording 70 to be seen only in a frame by frame freeze mode of operation for playback equipment 150. This is accomplished by recording such information on only a single frame, 202-210 etc. Thus, when recording 70 is played in a continuous manner the frame so recorded will flash upon the viewing screen; but only for such a short period of time that its persistency will be too short to allow viewing thereof. In fact, the viewer will not even be aware that it appeared, except maybe subliminally. When it is desired to view the single frame one need only run playback equipment 150 continuously until the frame approaches and then frame by frame until the information appears on the screen.

From the above description it will thus be seen that a novel and improved audio visual information system has been provided; which system provides for recording for audio visual presentation of expanded word entry type descriptions information, and comprehensive illustrated encyclopedia type text information and the corresponding cross-referencing in a conspicuous manner into said word entry test and encyclopedia text of the availability of said audio visual information.

It is understood that although we have shown the preferred form of my invention that various modifications may be made in the details thereof without departing from the spirit as comprehended by the following claims.

We claim:

1. An audio visual information system comprising:
   (a) first information means consisting of a plurality of graphic displays each concerning a particular selected topic;
   (b) each of said graphic displays including a main word text and a pictorialized description each sufficient to describe its particular selected subject without reference to the other and each disposed in a separate and distinct location within its graphic display;
   (c) each pictorialized description including a key illustration and a plurality of ancillary illustrations arranged in a sequence, the key illustrations of said plurality of graphic displays being sequenced.
   (d) second information means constituting a graphic arrangement of alphabetically set out expanded word descriptions of a plurality of selected topics and a reproduction of selected key illustrations from said graphic displays of said first information means when such key illustrations pertain to said topics and said key illustrations being in correlation to the alphabetical arrangement of said word descriptions; and (e) third information means constituting a recording for audio visual playback including audio visual display of a selected topic from said first information means and including at least a key illustration related to said topic, said recording being provided with index means for locating said topic, whereby the user of the system may retrieve the information of the above information means without substantial resort to text material.

2. The audio visual information system of claim 1 including:

(f) fourth information means constituting a graphic index including reproductions of said key illustrations of said first information means, and said key illustrations being arranged according to (c) or (d) with each such key illustration disposed adjacent a listing of selected types of information related to its particular topic.

3. The audio visual information system of claim 2 wherein said first information means, said second information means and said fourth information means are recorded for audio visual playback.

4. The audio visual information system of claim 2 wherein additional information not forming part of said first, second or fourth information means is recorded on said third information means recordings.

5. The audio visual information system of claim 1 wherein said third information means includes pertinent graphic arrangements of word descriptions from said second information means.

6. The audio visual information system of claim 5 wherein said graphic displays of said first information means included in said fourth information means being reduced in size when compared to said graphic displays as reproduced for said first information means.

7. The audio visual information system of claim 1 wherein said key illustrations when reproduced for said second information means being grouped together separate from said word definitions at a selected location in said graphic arrangement and being reduced in size when compared to the size therefore as displayed in said first information means.

8. The audio visual information system of claim 1 wherein said recording of said fourth information means is provided with sound.

9. The audio visual information system of claim 8 wherein said sound is background music, sound related to the subject matter to be displayed and voice over describing the information to be displayed.

10. The audio visual information system of claim 1 including:

record storing means in the form of a jacket for receiving and storing said recording and upon which, in addition to indicia for indicating the topic recorded upon the record, there is displayed text as recorded in the reference work.

11. The audio visual information system of claim 10 wherein said jacket also has displayed thereon expanded word descriptions related to the recorded topic.

12. The audio visual information system of claim 10 wherein said jacket includes a sleeve within which the record is stored.

13. The audio visual information system of claim 12 wherein said sleeve is formed from transparent material.

14. The audio visual information system of claim 12 wherein said sleeve has displayed thereon indicia indicative of sub-topics recorded on said recording and wherein said indicia are positionally located on a surface of said sleeve so that when said record is stored thereon the indicia is disposed in alignment with the corresponding information as recorded on said record means.

15. The audio visual information system of claim 14 wherein said indicia are words defining the sub-topic title.

16. The audio visual information system of claim 15 wherein said indicia are graphic pictorial illustrations indicative of the sub-topic information.

17. The audio visual information system of claim 14 wherein said indicia are frame designations.

18. The audio visual information system of claim 1 wherein said recording is in the form of a disc.

19. The audio visual information system of claim 1 wherein said recording is recorded for optical sensing and playback.

20. The audio visual information system of claim 1 wherein said recording has displayed thereon indicia indicative of sub-topics recorded on said record means and wherein said indicia are positionally located on said record means in positions corresponding to the locations where the sub-topic information is recorded.

21. The audio visual information system of claim 20 wherein said indicia are words defining the sub-topic title.

22. The audio visual information system of claim 20 wherein said indicia are graphic pictorial illustrations indicative of the sub-topic information.

23. The audio visual information system of claim 1 wherein (a) at least some of said information is recorded upon said recording for continuous viewing; and (b) some other of said information being recorded upon said recording for frame by frame viewing;

(c) said other of said information being recorded on said recording on at least one frame so that in a continuous viewing of said recorded information the lack of many multiple frames of the other information inhibits viewing thereof.

24. The audio visual information system of claim 23 wherein said at least one frame is a single frame.

* * * * *